US011820475B2

(12) United States Patent
Alam et al.

(10) Patent No.: US 11,820,475 B2
(45) Date of Patent: Nov. 21, 2023

(54) LINEAR AND ANGULAR POSITION STABILIZATION AND CONTROL OF AN UNDERWATER ROBOTIC SYSTEM

(71) Applicant: THE REGENTS OF THE UNIVERSITY OF CALIFORNIA, Oakland, CA (US)

(72) Inventors: Mohammad-Reza Alam, Orinda, CA (US); Alexandre Immas, Oakland, CA (US); Mohsen Saadat, Minneapolis, MN (US); Mir Abbas Jalali, Palo Alto, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 696 days.

(21) Appl. No.: 17/070,663

(22) Filed: Oct. 14, 2020

(65) Prior Publication Data

US 2021/0101666 A1    Apr. 8, 2021

Related U.S. Application Data

(63) Continuation of application No. PCT/US2019/027704, filed on Apr. 16, 2019.

(Continued)

(51) Int. Cl.
*B63G 8/16* (2006.01)
*B63B 79/40* (2020.01)
*B63B 79/10* (2020.01)
(Continued)

(52) U.S. Cl.
CPC ............... *B63G 8/16* (2013.01); *B63B 79/10* (2020.01); *B63B 79/40* (2020.01); *B63G 8/001* (2013.01);
(Continued)

(58) Field of Classification Search
CPC .... B63G 8/16; B63G 8/001; B63G 2008/004; B63B 79/40; B63B 79/10; G05D 1/0875
See application file for complete search history.

(56) References Cited

U.S. PATENT DOCUMENTS 5,791,591 A    8/1998   Hoban
5,966,991 A    10/1999  Gosselin
(Continued)

FOREIGN PATENT DOCUMENTS

CN    102012704 A    4/2011
WO    2010027127 A1  3/2010
(Continued)

OTHER PUBLICATIONS

ISA/US, United States Patent and Trademark Office (USPTO), International Search Report and Written Opinion dated Aug. 16, 2019, related PCT international application No. PCT/US2019/027704, pp. 1-16, claims searched, pp. 17-22.

*Primary Examiner* — Aryan E Weisenfeld
(74) *Attorney, Agent, or Firm* — O'BANION & RITCHEY LLP; John P. O'Banion (57) ABSTRACT

Autonomous underwater vehicles and systems are provided with fast stabilization and fine attitude control with a constant and high rotational speed flying wheel to rotate the vehicle's body with respect to its core and optionally a combination of reaction masses used in three perpendicular axes. The gimbal and the reaction mass inertial systems are used for fast response to any angular or linear disturbance coming from the ocean current or waves. When equipped for optical communications, the vehicle has an optical receiver and transmitter and controller that provides three levels of attitude stabilization: gimbal and the reaction mass inertial systems; isolated movable platform and fine optical beam steering for targeting the laser beam from the transmitter.

(Continued)

The ability to maintain precise positioning allows multiple vehicles to be optically linked.

5 Claims, 4 Drawing Sheets

Related U.S. Application Data (60) Provisional application No. 62/658,580, filed on Apr. 16, 2018.

(51) Int. Cl.
 B63G 8/00 (2006.01)
 G05D 1/08 (2006.01)

(52) U.S. Cl.
 CPC ..... G05D 1/0875 (2013.01); *B63G 2008/004* (2013.01)

(56) References Cited

U.S. PATENT DOCUMENTS

| | | | |
|---|---|---|---|
| 6,170,795 B1 | 1/2001 | Wayne | |
| 6,917,862 B2* | 7/2005 | Wie | B64G 1/286 |
| | | | 701/4 |
| 8,203,702 B1 | 6/2012 | Kane | |
| 10,479,465 B2* | 11/2019 | Moreno | B63G 8/16 |
| 2007/0200525 A1 | 8/2007 | Kanaoka | |
| 2008/0047375 A1 | 2/2008 | Sonoura | |
| 2017/0198885 A1 | 7/2017 | Caldwell | |

FOREIGN PATENT DOCUMENTS

| | | |
|---|---|---|
| WO | 2014083046 A1 | 6/2014 |
| WO | 2019204324 A1 | 10/2019 |

* cited by examiner

LINEAR AND ANGULAR POSITION STABILIZATION AND CONTROL OF AN UNDERWATER ROBOTIC SYSTEM

CROSS-REFERENCE TO RELATED APPLICATIONS

This application claims priority to, and is a 35 U.S.C. § 111(a) continuation of, PCT international application number PCT/US2019/027704 filed on Apr. 16, 2019, incorporated herein by reference in its entirety, which claims priority to, and the benefit of, U.S. provisional patent application Ser. No. 62/658,580 filed on Apr. 16, 2018, incorporated herein by reference in its entirety. Priority is claimed to each of the foregoing applications.

The above-referenced PCT international application was published as PCT International Publication No. WO 2019/204324 A1 on Oct. 24, 2019, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to underwater remote operating vehicles and systems, and more particularly to wireless autonomous underwater vehicles (AUVs) and systems of coordinated swarms of AUV's with attitude stability control systems, optical transmitters and receivers that can relay optical control signals and data between vehicles over long distances or areas.

2. Background Discussion

Deep sea mining depends heavily on real-time searching and monitoring operations of large spatial areas of the seabed. Searching and monitoring operations typically involve obtaining rough pictures of the seabed by ship-based sonar and then sending Remotely Operated Vehicles (ROVs) to further examine an area of interest. This approach is challenging because current technology is based on tethered ROVs and searching a large area requires many co-operating ROVs that are each connected to a mother-ship with a cable.

The connecting cable poses a serious risk and a limiting factor in many operations because the cable tether of each ROV can be twisted or can become tangled with the cable of other ROV's in the system. In addition, a small scratch to the connecting cable can compromise the cable when exposed to extreme pressure at working depths resulting in the total loss of the cable as well as the ROV.

Autonomous Underwater Vehicles (AUVs) have so far offered a poor alternative because of the impossibility to communicate with them during operation. If live communication was possible with the multiple ROV's searching the seabed, it would be a matter of days, if not hours, to locate anything lying on the seabed. Lack of underwater wireless communication between ROV's and ROV's and control ships has left the oceans mostly unexplored.

Current AUV's are categorized based on their shape and maneuvering strategies. The most commonly used AUV's have fuselage shapes and structures similar to submarines and winged torpedoes, and maneuver using their fins, wings, stabilizers, and through changing the direction of their thrust vector. AUVs with boxy shapes or open frames are propelled and orientated in space using two or more thrusters. Existing systems have some disadvantages: (i) accurate and agile orientation and position control/stabilization is challenging for these types of underwater vehicles, (ii) since thrusters are operational during reorientation maneuvers, a substantial amount of power is consumed to pump the bulk fluid, wasting the precious power storage of the vehicle and thus reducing its operational time, and (iii) drag forces and torques exerted on the thrusters significantly affect the efficiency of reorientation maneuvers.

There are several emerging applications for underwater systems where the agility and accurate control of location and/or orientation is critical such as with deep ocean imaging and optical data communications, etc. In the presence of random ocean currents and waves, however, conventional ROV systems need to use regular thruster activations to generate an appropriate force/torque to cancel the external disturbances to maintain the desired attitude or position of the vehicle. This approach produces a relatively slow response since it requires accelerating and pushing water around the vehicle body.

Accordingly, there is a need for multiple autonomous underwater vehicle systems that can effectively communicate with each other and with control vehicles that can efficiently and effectively maintain a controlled position in the water column and can be controlled without a tether.

BRIEF SUMMARY

The present technology is illustrated with an autonomous underwater vehicle design that is adapted for use with a system utilizing a swarm of small AUV's communicate with each other and source and control vehicles underwater by relaying optical signals. Transmission and reception of optical signals requires temporal and positional control over each the vehicles in the swarm of AUV's in the system.

The AUV's vehicles preferably are designed with attitude control systems that preserve the communications link regardless of the motion or rotation of the AUV from currents or other external forces as well as respond to commands from a control vehicle.

In this illustration, a system of multiple underwater vehicles equipped with high-speed laser communication modules provide a wireless high-speed data communication link between one vehicle and another vehicle or control station. The AUV's have an agile and accurate beam steering system for optical data communication underwater.

The attitude control systems of the vehicles are responsible for establishing and preserving the communication link between vehicles regardless of the motion and rotation of the AUV's. In one embodiment, a live video stream, captured by a camera installed on one of the AUV can be transmitted to a monitoring station while controlling the swarm of AUVs using the same optical communication link.

In one adaptation of the vehicles and system for laser optical communications, the AUV's have three different levels of attitude stabilization and control systems that are utilized to accurately steer a laser beam between its transmitter and receiver. The first level is responsible for stabilizing the AUV body orientation and position in space, the second level isolates the optical communication data system from any vibrations of the moving vehicle body, and the third level accurately and finely steers the optical beam to the target receiver on another AUV.

The illustrated AUV design preferably utilizes a generally cylindrical body with a nose containing the laser emitter and a tail that has a laser receiver. The body also has preferably one to four motors to provide forward or reverse motion and directional movement of the nose and beam emitter towards a target or control over the position of the receiver.

The body also preferably incorporates a double gimbal control moment gyro (DGCMG) to provide fast stabilization and control of the underwater robotic vehicle. In this architecture, the attitude maneuvers can be performed using reaction torques that the body of the vehicle gains from a central inertial system (e.g., a high-speed flywheel). Similar to a gymnast who uses the reaction forces from the ground to spin, flip and tumble, the central inertial system simulates the ground and provides an inertial platform to generate reaction torques. In one embodiment, we use an active gimbaled inertial system with two degrees of freedom to rotate the vehicle's body with respect to its core.

In one preferred embodiment, the body does not have any external fins or wings for attitude control or stabilization and uses only two propellers for propulsion. In another embodiment, the second level beam steering mechanism is a low inertia spatial parallel mechanism with a ball and plate type balancing platform for the rough movement of the location of the beam from the laser emitter. The fine targeting movement of laser beam is preferably produced with a gimbal-less dual-axis MEMS mirror to provide third level control in this embodiment.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of apparatus, system and methods for wirelessly controlled autonomous underwater vehicles with optical transmitters and receivers are generally shown. Several embodiments of the technology are described generally in FIG. 1 to FIG. 5 to illustrate the characteristics and functionality of the devices, methods and systems within the context of communications between a swarm of multiple autonomous vehicles. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Described herein is an apparatus and method for fast stabilization and control of an underwater robotic vehicle. In one embodiment, vehicle maneuvers are performed using reaction torques and forces that the body of the vehicle gains from central inertial systems. To control and stabilize the vehicle's orientation, in one embodiment an active gimbaled inertial system with two degrees of freedom is used with a constant and high rotational speed flying wheel to rotate the vehicle's body with respect to its core. To control and stabilize the linear position of the vehicle, in one embodiment a combination of reaction masses is used in three perpendicular axes. The gimbal and the reaction mass inertial systems are used to provide a fast response to any angular or linear disturbance coming from the ocean current or waves. In one embodiment, one or more thrusters attached to the body of the vehicle are used for the slower responses, particularly when a large reorientation of positioning movement is expected.

Figure 1:
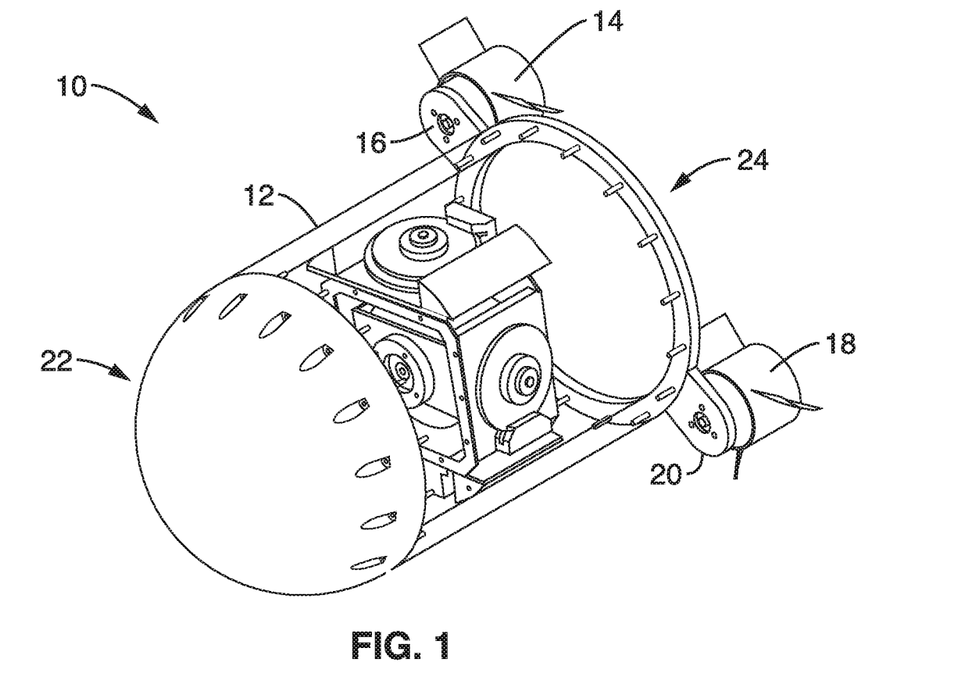
FIG. 1 is a schematic perspective view of an autonomous underwater vehicle with two counter-rotating motors and propellers for forward/backward propulsion, optical transmitter and receiver and attitude control system according to one embodiment of the technology.

Turning now to FIG. 1, a super-agile underwater vehicle 10 where a Double Gimbal Control Moment Gyro (DGCMG) device is used for attitude control and stabilization according to an embodiment of the presented technology is schematically represented.

In this embodiment, the AUV 10 has a cylindrical fuselage body 12 with a pair of positioning motors and propellers for maneuvering the AUV to designated positions in the water column. Although the fuselage body 12 is cylindrical in this embodiment, the body 12 can have the form of other shapes such as spherical or geometric shapes. The fuselage 12 has a nose end 22 that facilitates laser communications and a tail end 24 that is configured to receive laser communications with a beam receiving surface or structure in the embodiment shown.

In the embodiment shown in FIG. 1, two motors and propellers 14, 18 are mounted on opposite sides of the tail end of the fuselage 12 with motor mounts 16, 20. However, there may be as few as one motor or as many as four or more positioning motors and propellers mounted to the fuselage 12 to allow rough control over the position and orientation of the AUC.

The AUV embodiment of FIG. 1 depicts a fuselage 12 that has no external fins, wings, or appendages for attitude control or stabilization, and does not generate excess flows while maneuvering. Instead, it has two counter-rotating propellers 14, 18 only for forward/backward propulsion. Accurate attitude maneuvers can be performed using reaction torques that the fuselage body 12 of the vehicle 10 gains from the central DGCMG system. Additionally, due to the optimally round or cylindrical fuselage, the AUV 10 experiences greatly reduced form drag, and can make rapid in-place turns without turning on its propellers.

The DGCMG system is installed inside the fuselage 12 of an underwater AUV 10 to further stabilize and control its orientation in water. A DGCMG system is preferably used for attitude stabilization and control of the main platform where the laser data communication module along with the rest of the components (such as sensors, controllers, batteries, etc.) are installed.

Figure 2:
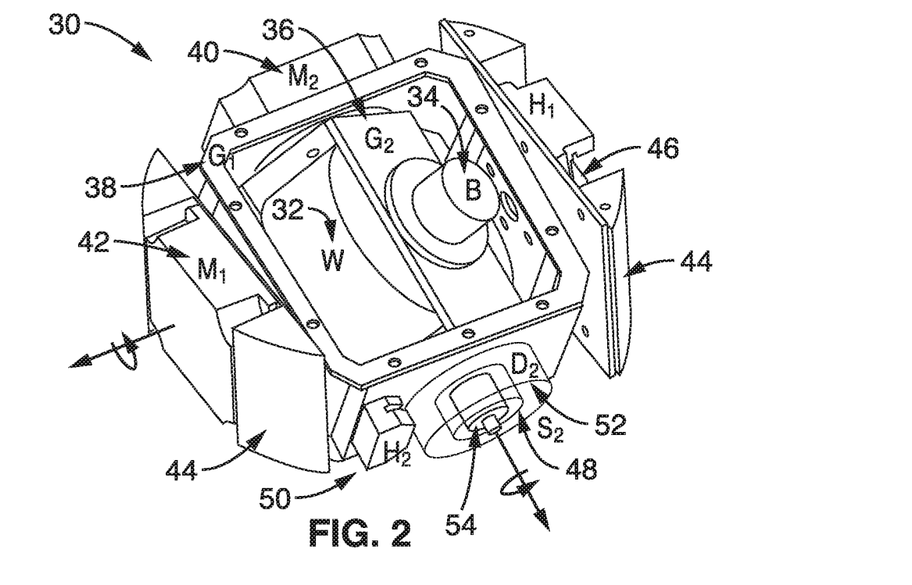
FIG. 2 is a perspective side view of a Double Gimbal Control Moment Gyro (DGCMG) system used for attitude stabilization and control of the main platform.
Figure 3:
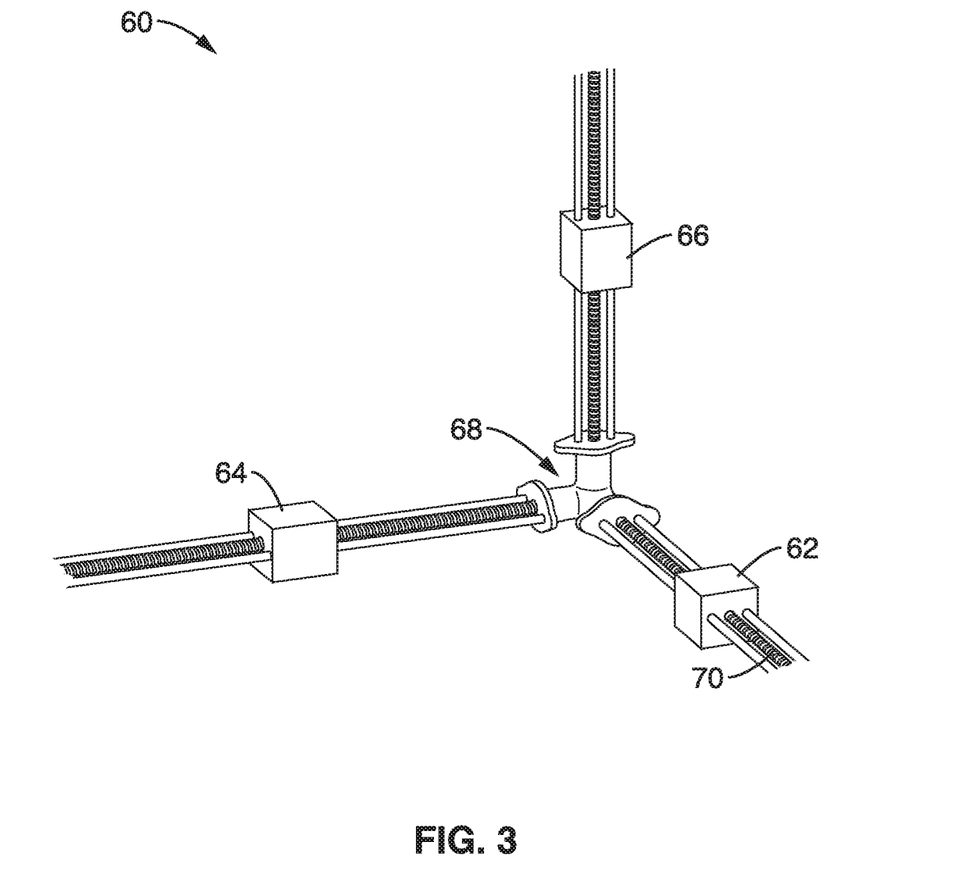
FIG. 3 is a depiction of a reaction mass mechanism for fast response linear position stabilization according to one embodiment of the technology.

As shown in FIG. 2, the operational core 30 of the DGCMG system includes four rigid bodies that can rotate with respect to each other. These rigid bodies are: (i) central gyro with high-speed wheel 32 and motor 34, (ii) inner gimbal 36 and its components, (iii) the outer gimbal 38 and its components, and (iv) the fuselage or the body 12 of the vehicle 10. The inner gimbal 36 can rotate relative to the outer gimbal 38 through the gimbal motor 40 while the outer gimbal 38 can rotate relative to the AUV fuselage body 12 through the gimbal motor 42.

Attitude control and stabilization is achieved through the gyroscopic reaction torques that the platform gains from rotating the high-speed central wheel 32. Similar to a gymnast who uses the reaction forces from the ground to spin, flip and tumble, the central wheel simulates the ground and provides an inertial platform to generate reaction torques. The desired reaction torque can be obtained by rotating the high-speed wheel around the inner and outer gimbal axes using the torque motors 42 and 40 connected to each gimbal. Additionally, in the presence of random currents and other external disturbances, the orientation of the AUV's platform can be stabilized by locking (or braking) the motors 40, 42 of the gimbals 36, 38.

In the embodiment of FIG. 2, the frame 44 of the outer gimbal 38 is mounted to the interior of fuselage 12. From one side the outer gimbal 38 is supported by the torque motor 42 and from the other side it is supported by a roller bearing assembly 46 to allow controlled rotation of the outer gimbal 38. The rotation of the outer gimbal 38 is preferably sensed by a shaft encoder and slip ring (not shown) that are part of the roller bearing assembly 46. The disk of the encoder is supported by the slip ring, which is used for data and power communication between the fuselage 12 and electromechanical components installed on the outer gimbal 38. The outer gimbal 38 has about one degree of rotational freedom with respect to the body 12 of the vehicle.

The inner gimbal 36 is mounted on the outer gimbal frame 38. From one side the inner gimbal 36 is supported by the torque motor 40, and on the other side it is supported by a roller bearing assembly 48. A shaft encoder composed of encoder head 50 and disk 52 of the assembly 48 senses the rotation of the inner gimbal 36 with respect to the outer gimbal 38. To achieve limitless gimbal angular travel and free rotation (for both the inner and outer gimbals), power and electrical signals are transmitted between the vehicle body and DGCMG components through slip rings of the roller bearing assemblies 46 and 48. Slip ring 54 of assembly 48 transmits data and electrical power between the outer gimbal 38 and the brushless motor 34 that drives the central gyro wheel 32, and slip ring of bearing assembly 46 transmits power and data between electronic circuits fixed to the body of the AUV and motor 40, encoder head 50 and slip ring 54. Note that the pivotal axis of the outer gimbal (in the UUV body frame) and the pivotal axis of the inner gimbal (on the outer gimbal) are always perpendicular to each other. The inner gimbal 36 has approximately two degrees of rotational freedom with respect to the vehicle fuselage 12.

The dynamically-balanced wheel 32 has a high spinning velocity and it is mounted on inner gimbal 36. The spinning axis of this wheel is always perpendicular to the pivotal axis of the inner gimbal. The brushless DC motor 34, mounted on the inner gimbal 36, spins gyro wheel 32 with an angular speed of preferably greater than about 10000 rotations per minute (rpm). The speed of gyro motor 34 as well as the gimbal motors 40, 42 can be controlled by a controller. In this embodiment, the central gyro 32 has three degrees of rotational freedom with respect to the vehicle body 12. The body itself has six degrees of freedom (three rotational and three translational) with respect to the inertial frame.

When one or both gimbals rotate (assuming that the gyro 32 is spinning inside the inner gimbal 36 with a constant angular velocity), the change in the direction of the gyro's angular momentum vector generates a reactive torque on the main body of vehicle. The reaction torque is transmitted to the body at the point where the DGCMG system is mounted on the fuselage. The magnitude of this torque depends on the angular speed of motors 40 and 42. Theoretically, if the angular speed of the spinning gyro wheel 32 becomes infinity, its angular momentum vector will stay fixed in space with respect to the inertial frame, regardless of the magnitude of torques applied by the motors. In this extreme case, the two activating gimbal motors 40, 42 will rotate the ROV body (as well as gimbals) in space, while the gyro's spin axis remains invariant. In reality, however, the angular velocity of the gyro wheel 32 has a finite magnitude and the actuation of outer gimbal motor 42 and inner gimbal motor 40 implies a change in the angular momentum vector of the gyro. Due to the relatively large angular momentum of the gyro compared to that of the vehicle's body, the net rotation of the gyro's spin axis will be much smaller than the body rotation. Unlike reaction wheels used in the attitude control of satellites, where the reactive torque is generated simply by changing the spin rate of rotors, the DGCMG system tilts the spin axis of the gyro (rotor) without changing its spinning velocity. This makes the system more compact, less massive and quickly responsive.

While the DGCMG device can effectively stabilize the orientation of the underwater vehicle, it cannot affect its linear position. Therefore, to control and stabilize the position of the vehicle, a reaction mass system 60 of a combination of reaction masses 62, 64, 66 used in three perpendicular axes is used as represented simply in FIG. 3. Each reaction mass in this embodiment is connected to one of three motors 68 through a lead screw mechanism 70 of each axis. While the motors are connected to the vehicle's body, the reaction masses can move relative to the body once their corresponding actuator motor is activated. According to the conservation of linear momentum, moving each reaction mass in one direction will produce a linear force on the vehicle's body in the opposite direction. This force can be used to quickly respond to any disturbance coming from surrounding water current and waves. Therefore, a fast and accurate linear position control and stabilization would be achievable through the device of FIG. 3.

Figure 4:
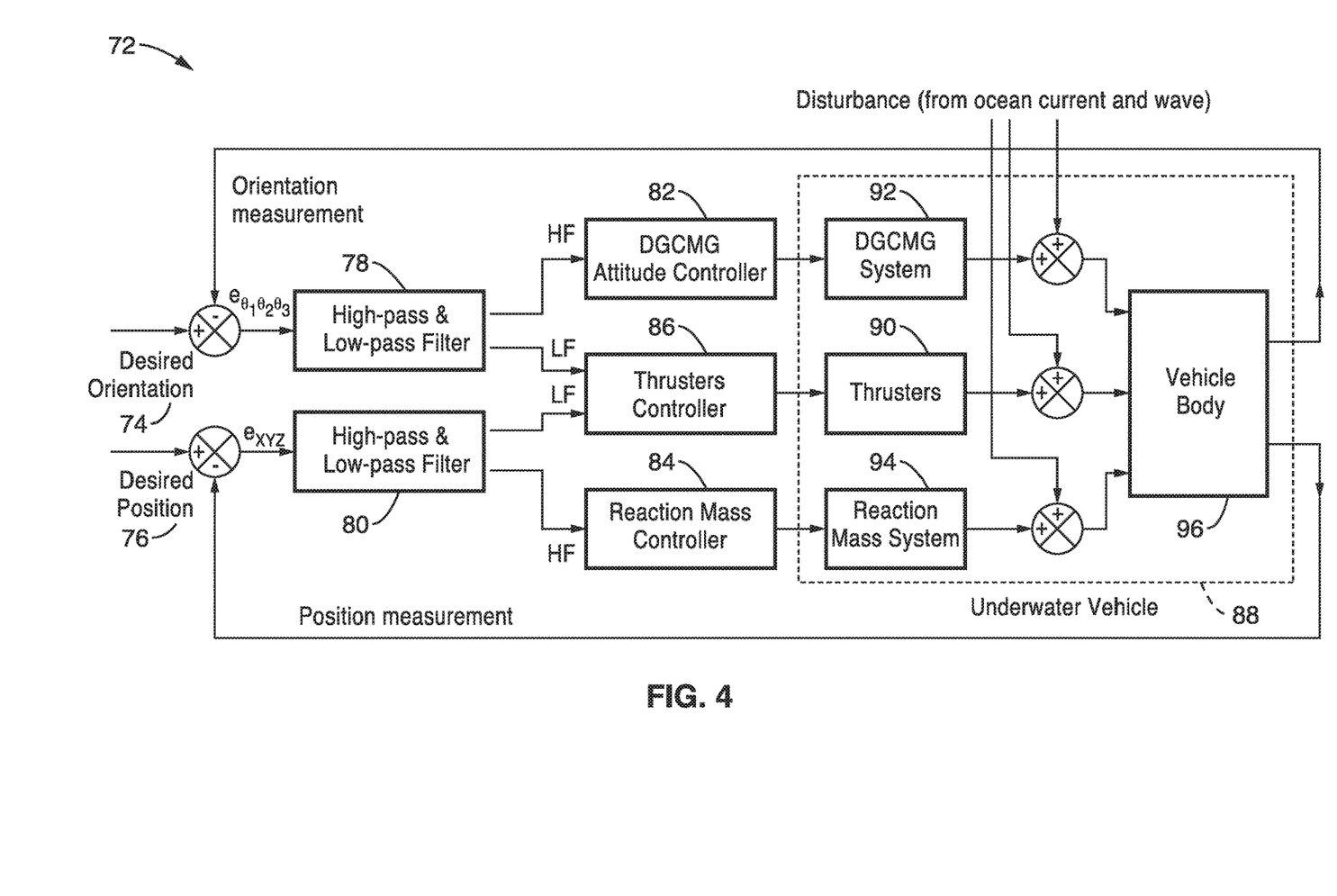
FIG. 4 is a block diagram of an embodiment of the orientation and position controller of the presented technology, where the high frequency component of error will be compensated through the DGCMG and reaction mass systems, while the low frequency error will be corrected via the combination of thrusters attached to the body.

The DGCMG and the reaction mass systems may be used for fast response to any angular or linear disturbance coming from the ocean current or waves. A cluster of thrusters attached to the body of the vehicle may still be needed for the slower responses, particularly when a large reorientation or movement of the entire vehicle is expected. A simple block diagram representing this control strategy 72 is shown in FIG. 4. The main objective of the device and its controller is to provide a fixed and stable platform under water surface that cancels the disturbances generated by the random ocean current and waves.

In the embodiment shown in FIG. 4, the desired position 74 and desired orientation of the vehicle are input from a controller and passed through high-pass and low-pass filters 78, 80. The filtered high frequency components of the orientation and position signals are fed into the DGCMG Attitude Controller 82 and the Reaction Mass Controller 84, respectively, while the filtered low frequency components are fed into the Thrusters Controller 86. The three controllers 82, 84, 86 are connected wirelessly (or optionally by a tether) to the thrusters 90, DCCMG system 92 or mass reaction system 94 of the underwater vehicle 88. The high frequency component of error from the high-pass filters for the desired orientation and desired position can be compensated through the DGCMG and reaction mass systems, respectively, while the low frequency error may be corrected via the combination of thrusters attached to the body 96 of the underwater vehicle 88.

In an alternative embodiment adapted for optically based communications between AUV's, a system architecture with three different levels of attitude stabilization and control systems are used to accurately steer a laser beam between its transmitter and receiver. The main practical challenge in implementing the optical data communication with laser in water is the pointing accuracy and stability of the laser beam, as well as the beam divergence. In order to precisely steer a duplex laser beam between the transmitter (i.e. laser diode) and receiver (i.e. photodiode), the first level is responsible for stabilizing the orientation of the AUV main platform by isolating it from any motion or rotation due to external sources such as random ocean currents. The second level is used to mechanically isolate the optical data communication system from the fuselage body such that its orientation and pointing angle can be independently (and quickly) changed regardless of the swimmer's attitude. Finally, the third layer will be used for a very fine steering control and stabilization of the optical data beam.

In this embodiment, the first level position control and stabilization are preferably provided by an AUV with a double gimbal control moment gyro apparatus and system such a described in FIG. 1 and FIG. 2. The second level of the control system is preferably a low-inertia spatial parallel mechanism is used to isolate the optical communication data system from any vibrations or movements of the moving vehicle and as a rough beam steering mechanism. Conventional ball and plate balancing systems have sensors, actuators, and controls that can keep a free rolling ball in a desired position on a flat plate and accounts for possible external disturbances.

In one embodiment, the preferred low-inertia spatial parallel mechanism is a five-bar linkage ball and plate balancing system that is capable of rotating a plate around two perpendicular axes ($\theta_1$ and $\theta_2$) in space while its center remains fixed. In the embodiment shown in FIG. 5, the actuators are located on the base of the mechanism which hugely reduces the inertia of the rotating components. This feature allows the system to achieve higher angular acceleration which would be necessary to obtain a robust laser beam alignment between its transducer and receiver. Additionally, it will help to minimize the backlash between the main actuators and the end effector of the system where the third layer of beam steering system will be installed.

Figure 5:
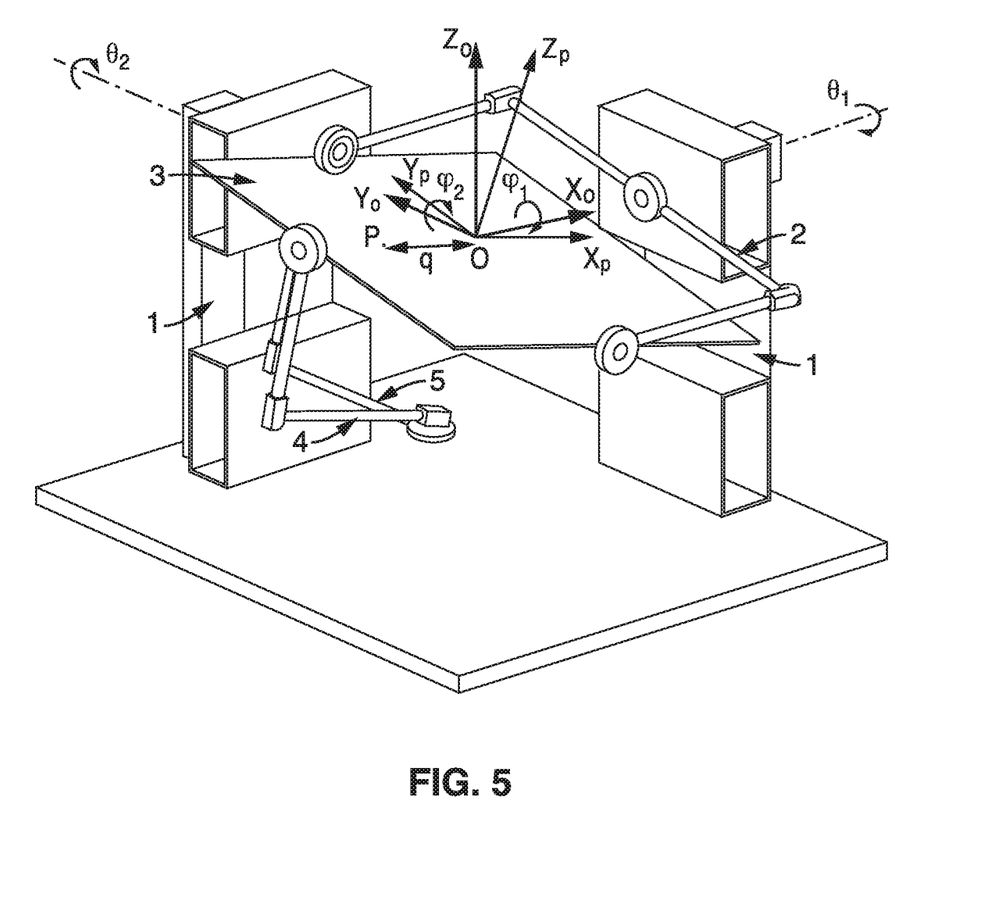
FIG. 5 is a diagram of a low-inertia spatial parallel platform mechanism used as a second layer beam steering system according to an alternative embodiment of the technology.

This ball and plate design shown in FIG. 5 mechanically isolates the optical data communication module from the AUV platform and achieve fast (<1 sec), large (between 2° to 30°) and accurate (<0.5° beam steering regardless of the AUV's body orientation.

The third level of this system is for a very fine steering control and stabilization of the optical data beam. Accurate optical beam steering performance is preferably achieved with a gimbal-less dual-axis (tip-tilt) MEMS mirror as the third layer of beam steering control. The dual axis MEMS mirror system has been used with optical beam steering systems in many industries.

The devices direct laser beams to optical scanning angles of up to 30° at high speeds in both axes. Compared to the large-scale galvanometer optical scanners, the dual-axis MEMS mirror requires several orders of magnitude less driving power, has a very high bandwidth (1 kHz) and has a very high accuracy.

The dual-axis MEMS mirror system is also preferred because it is a highly repeatable device with no detectable degradation over time mainly due to the electrostatic drive methodology and use of single-crystal silicon materials. Positional precision of the mechanical tilt in open loop driving of the mirror actuator is within 1 milli-degrees (<17 μrad). This system can be utilized as the last layer of beam steering control to maintain a robust and stable laser beam between the transducer diode and its photodiode receiver.

The three different levels of attitude stabilization and control systems in this embodiment are used to accurately steer a laser beam between its transmitter and receiver. Laser light transmissions between two underwater AUV's, or between a fixed navigation station and a moving AUV device permit wireless communications underwater. Optical data communication is usually performed by propagating laser light in a glass fiber. However, if the laser beam angle can be accurately targeted on a photodiode, the glass fiber will not be necessary. By generating a two-way Ethernet laser link between the two systems, for example, a live video signal can be transmitted to the navigation station from a remote AUV, while the desired control commands can be sent to the various AUV devices in the water.

The technology described herein may be better understood with reference to the accompanying examples, which are intended for purposes of illustration only and should not be construed as in any sense limiting the scope of the technology described herein as defined in the claims appended hereto.

Example 1

To demonstrate the performance of the device in achieving attitude stabilization and control, an attitude control simulator where the DGCMG unit of FIG. 2 was installed inside a spherical shell was designed and fabricated. The spherical shell was supported on a mechanism that included three ball roller (i.e. eye) bearings such that it can freely rotate in 3D space. A nonlinear feedback controller based on back stepping approach was designed according to the system complex dynamics and was implemented on the setup in order to track a desired orientation in space.

A camera was installed on the spherical shell and was used with image processing techniques to measure the spatial orientation of the shell with respect to a light source. The objective was to use the DGCMG system as an actuator to turn and rotate the shell in space such that it tracks the light source. The system was capable of quickly reorienting the spherical shell to track the light source and to place it at the center of the camera display. Similarly, this technique can be used to stabilize and control the AUV platform on which the laser communication module will be installed.

In a separate demonstration, the DGCMG system was implemented in an underwater robotic vehicle to stabilize and control its orientation in water. As shown in FIG. 1, the DGCMG system was installed inside the fuselage of an underwater AUV. The vehicle had no external fin, wings, or appendages for attitude control or stabilization, and does not generate excess flows while maneuvering. Instead, it has two counter-rotating propellers only for forward/backward propulsion. Accurate attitude maneuvers were performed using reaction torques that the body of the AUV gains from the central DGCMG system. Additionally, due to the optimally round fuselage, the AUV experiences the least form drag, and can make rapid in-place turns without turning on its propellers. This demonstrated the viability of the first level architecture for attitude stabilization and control over the body position in space and positioning of the main platform of the laser transmitter system.

Example 2

To further demonstrate the functional principles of the system and methods, a spatial parallel mechanism with minimum inertia for achieving maximum and agility for use as a second layer of the beam steering architecture was evaluated. In the mechanism shown in FIG. 5, the actuators of the five-bar linkage are located on the base of the mechanism which greatly reduced the inertia of the rotating components. This feature allowed the system to achieve higher angular acceleration which would be necessary to obtain a robust laser beam alignment between its transducer and receiver.

The effectiveness of the parallel mechanism in a Ball and Plate balancing System of FIG. 5 was also evaluated. The objective was to move a small ball along a predefined trajectory on a plate with minimum error. A gain scheduling control scheme was designed and implemented to achieve this goal. A digital camera mounted above the plate was used to measure the instantaneous location of the ball on the plate. The resulting system was a super agile balancing system that not only could track a ball along a desired trajectory with minimum error, but also could catch and stabilize a ball thrown on the plate with a high initial speed. This design mechanically isolated the optical data communication module from the laser platform and achieve fast (<1 sec), large (between 2 to 30) and accurate (<0.5) beam steering regardless of body orientation of the AUV.

A gimbal-less, dual-axis MEMS mirror laser beam production was also tested as the third layer of beam steering control in combination with the other control features. The device produced highly repeatable results with no detectable degradation over time mainly due to the electrostatic drive methodology and single-crystal silicon material selection. The positional precision of the mechanical tilt in open loop driving of the mirror actuator was within 1 milli-degrees (<17 μrad). The viability of three-layer architecture of attitude stabilization and control was demonstrated to be effective and accurate.

Example 3

To further demonstrate the operational principles of the apparatus and methods, an optical communications link between two AUV's or fixed navigation station was evaluated. By generating a two-way Ethernet laser link between the two systems, a live video signal can be transmitted to the navigation station, while the desired control commands can be sent to the AUV in the water. We have tested the feasibility of this approach using off-the-shelf TTL laser diode as well as a photodiode receiver. For the sake of simplicity, the data communication rate was limited to 10 Mb/s. The communication setup had two pairs of channels: i) the transmit channel and ii) the receive channel.

The objective of the transmit channel is to convert the electric

Ethernet signal, which comes from a computer controller, into an optical signal by varying the brightness of the laser diode. While a constant current generated by an operational amplifier produces an offset brightness. For the laser diode, the converted Ethernet signal can be added to the offset brightness via an AC coupling. The goal of the receive channel is to detect the optical signal generated by its corresponding transmit board, convert it back into an electric signal, and send the electric signal to the receive cable pair of the coupled computer. This system was tested and was able to transmit a live video stream captured by a camera attached to the first AUV computer to a second AUV computer via an optical Ethernet.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media or may be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An underwater robotic vehicle, comprising: (a) vehicle body with an interior core; (b) an active attitude stabilization system centered in the interior core of the body configured to rotate the body of the vehicle with respect to the center of the body; (c) one or more thrusters coupled to the vehicle body; (d) a position-orientation controller configured to control the attitude stabilization system and thrusters to position and orient the vehicle and to provide a fast response to any angular or linear disturbance encountered in an environment surrounding the vehicle.

2. The vehicle of any preceding or following embodiment, the attitude stabilization system further comprising: a reaction mass inertial system disposed in the interior core of the body, the system configured to control and stabilize linear position of the vehicle, wherein reaction masses are used in three perpendicular axes; wherein movement of each reaction mass in one direction will produce a linear force on the body of the vehicle in the opposite direction; and wherein vehicle maneuvers are performed using reaction torques and forces that the body of the vehicle gains from the attitude stabilization systems.

3. The vehicle of any preceding or following embodiment, wherein the attitude stabilization system comprises an actuator selected from the group of actuators consisting of a momentum wheel, a reaction wheel, a single gimbal control moment gyro, and a double gimbal control moment gyro.

4. The vehicle of any preceding or following embodiment, further comprising: an optical signal receiver coupled to an exterior surface of the vehicle body and operably connected to the controller.

5. The vehicle of any preceding or following embodiment, the optical signal receiver further comprising a light amplifier.

6. The vehicle of any preceding or following embodiment, further comprising: an optical signal receiver coupled to an exterior surface of the vehicle body; an optical signal transmitter coupled to an exterior surface of the vehicle body; and an optical communications system controller operably connected to the optical signal receiver, the optical signal transmitter and to the position-orientation controller.

7. The vehicle of any preceding or following embodiment, further comprising: a laser optical signal targeting system controlled by the optical communications system controller, wherein a location of a laser optical signal from the optical signal transmitter can be targeted by the optical communications system controller.

8. The vehicle of any preceding or following embodiment, wherein the laser optical targeting system comprises: a platform supported by a five-bar linkage capable of rotating a plate around two perpendicular axes in space while its center remains fixed; and a gimbal-less, dual-axis MEMS mirror mounted to the platform for fine beam steering control, wherein a laser beam can be accurately targeted on to a photodiode receiver of a second vehicle.

9. An autonomous mobile underwater apparatus for optical communications, comprising: (a) a vehicle body with a plurality of exterior thrusters, optical signal transmitter, optical signal receiver and an interior core; (b) an active attitude stabilization system centered in the interior core of the body configured to rotate the body of the vehicle with respect to the center of the body; (c) a processor; and (d) a non-transitory memory storing instructions executable by the processor; (e) wherein the instructions, when executed by the processor, perform steps comprising: (i) receiving an optical signal with the optical signal receiver; (ii) identifying a target; (iii) orienting a direction of an optical signal transmitter beam towards the identified target with the attitude stabilization system or thrusters; (iv) relaying the received optical signal to the target; and (v) maintaining the optical signal transmission beam on the target for a period of time.

10. The apparatus of any preceding or following embodiment, wherein the executed instructions further comprise the step of amplifying the received optical signal before relaying to the target.

11. The apparatus of any preceding or following embodiment, wherein the executed instructions further comprise the step of receiving a target location for optical transmission from a received optical signal.

12. The apparatus of any preceding or following embodiment, the attitude stabilization system further comprising: a reaction mass inertial system disposed in the interior core of the body, the system configured to control and stabilize linear position of the vehicle, wherein reaction masses are used in three perpendicular axes; wherein movement of each reaction mass in one direction will produce a linear force on the body of the vehicle in the opposite direction; and wherein vehicle maneuvers are performed using reaction torques and forces that the body of the vehicle gains from the attitude stabilization systems.

13. The apparatus of any preceding or following embodiment, wherein the attitude stabilization system comprises an actuator selected from the group of actuators consisting of a momentum wheel, a reaction wheel, a single gimbal control moment gyro, and a double gimbal control moment gyro.

14. The apparatus of any preceding or following embodiment, wherein the optical signal transmitter further comprises: a platform supported by a five-bar linkage capable of rotating a plate around two perpendicular axes in space while its center remains fixed; and a gimbal-less, dual-axis MEMS mirror mounted to the platform for fine beam steering control, wherein a laser beam can be accurately targeted on to a target photodiode receiver of a second apparatus.

15. The apparatus of any preceding or following embodiment, wherein the executed instructions further comprise the steps of: controlling body orientation; controlling platform position; and controlling MEMS mirror position.

16. An apparatus for fast stabilization and control of an underwater robotic vehicle, the vehicle having a body with a core, the apparatus comprising: (a) an active gimbaled inertial system with two degrees of freedom, the inertial system having a constant and high rotational speed flywheel configured to rotate the vehicle's body with respect to its core to control and stabilize orientation of the vehicle; (b) a reaction mass inertial system configured to control and stabilize linear position of the vehicle, wherein reaction masses are used in three perpendicular axes; (c) a plurality of thrusters attached to the body of the vehicle; and (d) a position/orientation controller configured to receive position and orientation signals from a user and control the active gimbaled inertial system and the reaction mass inertial system to position and orient the vehicle and provide fast response to any angular or linear disturbance coming from ocean current or waves; (e) wherein vehicle maneuvers are performed using reaction torques and forces that the body of the vehicle gains from the inertial systems.

17. The apparatus of any preceding or following embodiment, wherein the thrusters are used for controlling slower responses.

18. The apparatus of any preceding or following embodiment, wherein the slower responses are used for large reorientation/movement.

19. The apparatus of any preceding or following embodiment, wherein the active gimbaled inertial system is used for controlling small reorientation/movements 20. The apparatus of any preceding or following embodiment, wherein the position/orientation controller comprises: (a) a Double Gimbal Control Moment Gyro (DGCMG) controller; (b) a thruster controller; (c) a reaction mass controller; (d) the DGCMG controller configured to receive high pass filtered orientation signals; (e) the reaction mass controller configured to receive high pass filtered position signals; (f) the thruster controller configured to receive low pass filtered orientation and position signals; (g) an orientation feedback loop between the position/orientation controller and the vehicle; and (h) a position feedback loop between the position/orientation controller and the vehicle; (i) wherein high frequency orientation and position error components are compensated through the active gimbaled inertial system and reaction mass inertial system, respectively; and (j) wherein low frequency error is corrected by the thrusters.

21. The apparatus of any preceding or following embodiment, further comprising a position sensor.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for fast stabilization and control of an underwater robotic vehicle, said vehicle having a body with a core, said apparatus comprising:
   (a) a Double Gimbal Control Moment Gyro (DGCMG) system with two degrees of freedom, said DGCMG system comprising an inner gimbal rotatably coupled to an outer gimbal, and a constant and high rotational speed gyro wheel rotatably coupled to said inner gimbal, wherein the outer gimbal is configured to be rotatably coupled to the vehicle's body, and wherein the DGCMG system is configured to rotate the vehicle's body with respect to its core to control and stabilize orientation of the vehicle;
(b) a reaction mass system comprising a combination of reaction masses positioned in three perpendicular axes, each said reaction mass connected to a corresponding motor through a corresponding screw mechanism configured to move the reaction mass along a corresponding axis, each said motor configured for connection the vehicle's body, wherein the reaction mass inertial system is configured to control and stabilize linear position of the vehicle;
(c) a plurality of thrusters configured to be attached to the body of the vehicle; and
(d) a position/orientation controller configured to receive position and orientation signals from a user and control said DGCMG system and said reaction mass inertial system to position and orient said vehicle and provide fast response to any angular or linear disturbance coming from ocean current or waves;
(e) said position/orientation controller comprising:
(1) a DGCMG controller configured to receive high pass filtered orientation signals;
(2) a thruster controller configured to receive low pass filtered orientation and position signals;
(3) a reaction mass controller configured to receive high pass filtered position signals;
(4) an orientation feedback loop between the position/orientation controller and the vehicle;
(5) a position feedback loop between the position/orientation controller and the vehicle;
(6) wherein high frequency orientation and position error components are compensated through the active gimbaled inertial system and reaction mass inertial system, respectively; and
(7) wherein low frequency error is corrected by said thrusters;
(f) wherein vehicle maneuvers are performed using reaction torques and forces that the body of the vehicle gains from said DGCMG and said reaction mass inertial system.

2. The apparatus of claim 1, wherein said thrusters are used for controlling slower responses.

3. The apparatus of claim 2, wherein said slower responses are used for large reorientation/movement.

4. The apparatus of claim 2, wherein said active gimbaled inertial system is used for controlling small reorientation/movements.

5. The apparatus of claim 1, further comprising a position sensor.

* * * * *